Figure 1:
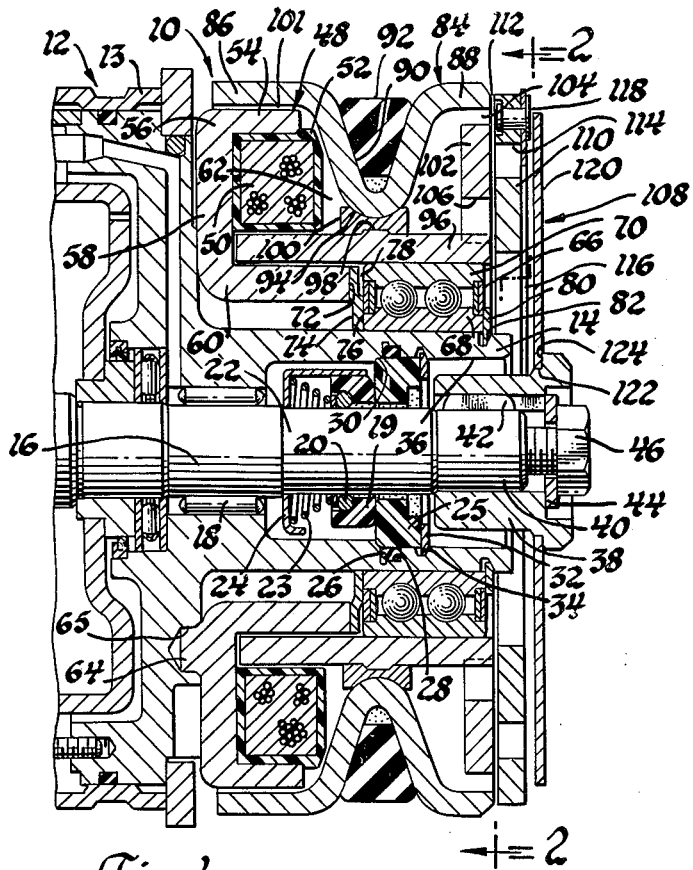

United States Patent [19]

Bennett et al.

[11] 4,122,930
[45] Oct. 31, 1978

[54] ELECTROMAGNETIC CLUTCH

[75] Inventors: George T. Bennett, Kettering; Byron L. Brucken, Miamisburg, both of Ohio

[73] Assignee: General Motors Corporation, Detroit, Mich.

[21] Appl. No.: 844,538

[22] Filed: Oct. 25, 1977

[51] Int. Cl.² .................................. F16D 27/10
[52] U.S. Cl. ...................................... 192/84 C
[58] Field of Search ...................... 192/84 A, 84 C

[56] References Cited

U.S. PATENT DOCUMENTS

| | | | |
|---|---|---|---|
| 2,919,777 | 1/1960 | Walter | 192/84 C |
| 3,205,989 | 9/1965 | Mantey | 192/84 C |
| 3,724,621 | 4/1973 | Heidorn | 192/84 C |
| 3,762,516 | 10/1973 | Matsushita | 192/84 C |
| 3,876,048 | 4/1975 | Briar | 192/84 C |
| 3,978,953 | 9/1976 | Miller | 192/84 C |
| 4,069,572 | 1/1978 | Pierce | 192/84 C X |

Primary Examiner—Allan D. Herrmann
Attorney, Agent, or Firm—John P. Moran

[57] ABSTRACT

The electromagnetic clutch illustrated includes an electromagnetic coil assembly, an armature plate, and a pulley assembly having cylindrical end portions with an intermediate groove portion, and a hub portion, all of which form part of a 4-pole magnetic flux path. A nonmagnetic ring member is mounted in support relationship between the groove portion and the pulley hub. A clutch rotor is secured to an end of the pulley hub adjacent the armature plate and extends radially outwardly therefrom so as to provide a uninterrupted circular air space with the cylindrical end portion adjacent the armature plate, such that no shorting of the lines of flux can occur from the end portion to the clutch rotor, providing a faster and stronger attraction of the armature plate when the electromagnetic coil is energized.

4 Claims, 2 Drawing Figures

ELECTROMAGNETIC CLUTCH

This invention relates generally to electromagnetic clutches and, more particularly, to electromagnetic clutches for use with vehicular air-conditioning compressors.

An object of the invention is to provide an improved electromagnetic clutch including a pulley rim and rotor arrangement wherein shorting across the air gap between the rim and the rotor is eliminated.

Another object of the invention is to provide an improved electromagnetic clutch including a coil assembly, an armature plate, and a pulley assembly consisting of an outer member having inner and outer cylindrical end portions and an intermediate groove portion, an inner cylindrical hub member, a non-magnetic ring member mounted in support relationship between the hub member and the groove portion such that the inner cylindrical end portion extends freely adjacent the coil housing, and the outer cylindrical end portion extends freely toward the armature plate, and a clutch rotor or pole member secured to the end of the hub member adjacent the armature plate and extending radially outward therefrom so as to provide an uninterrupted circular air space with respect to the adjacent outer cylindrical end portion, thereby eliminating shorting of the magnetic flux path at the radially outermost pole of a multiple pole arrangement.

Figure 2:
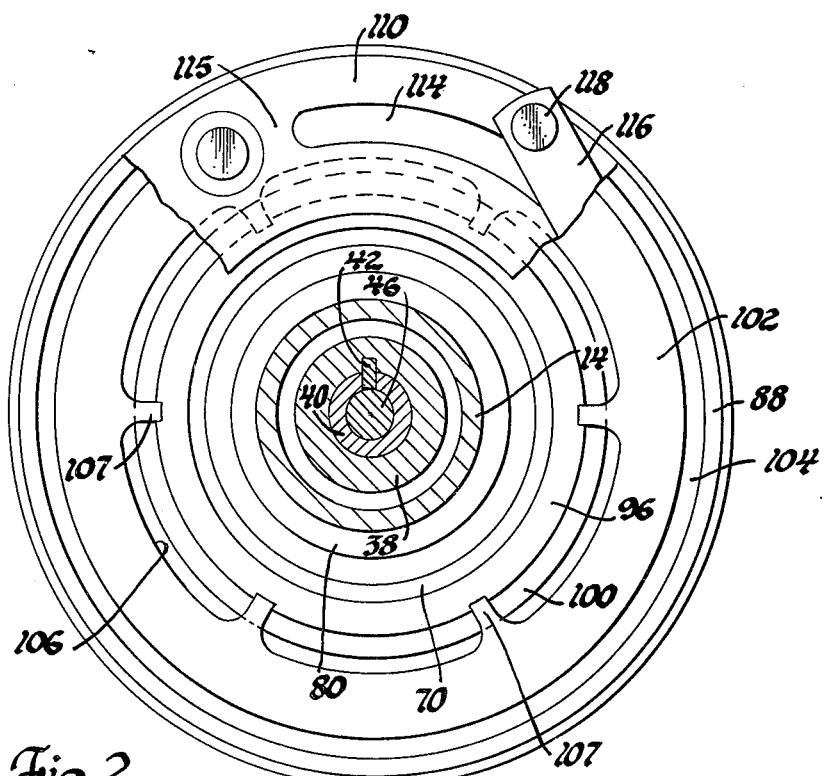

These and other objects and advantages of the invention will be apparent when reference is made to the following description and accompanying drawing, wherein:

FIG. 1 is a cross-sectional view illustrating an electromagnetic clutch embodying the invention, and FIG. 2 is a cross-sectional view taken along the plane of the line 2—2 of FIG. 1, and looking in the direction of the arrows.

Referring now to the drawing in greater detail, there is illustrated an electromagnetic clutch 10 suitable for driving an automatic air conditioning compressor 12 including a housing or casing 13, on the forward end of which is formed a fixed tubular extension 14. An input or drive shaft 16 for driving the compressor 12 is rotatably mounted within needle bearings 18, and extends outwardly through the center of the tubular extension 14. A suitable shaft seal 19, including a rotating part 20, is mounted around a reduced intermediate portion 22 of the drive shaft 16 to prevent leakage therepast. A coil spring 23 is mounted between a suitable retainer 24 abutted against the shoulder between the shaft portions 16 and 22 and the rotating part 20 of the shaft seal 19, to urge the latter into engagement with a stationary seal ring 25. The latter is sealed within the tubular extension 14 by an O-ring type seal ring 26 mounted in a first groove 28 formed in the inner peripheral surface of the tubular extension 14. The seal ring 24 is confined axially between a shoulder 30 formed within the tubular extension 14 and a split locking ring 32 mounted in a second groove 34 formed in the inner peripheral surface of the tubular extension 14. The inner bore of the tubular extension 14 is enlarged at 36 to facilitate assembly and removal of the locking ring 32, the stationary seal ring 24, and the rotating part of the shaft seal 20.

The enlarged inner bore 36 of the tubular extension 14 provides space for the accommodation of the greater portion of a drive hub 38 which is mounted upon a reduced end portion 40 of the input shaft 16. The drive hub 38 is keyed to the shaft end portion 40 by a suitable key 42 and is retained thereon by a washer 44 and a bolt 46 threadedly mounted in a threaded opening formed in the end of the end portion 40.

A coil assembly 48 includes an annular electromagnetic coil 50, of a predetermined number of turns embedded within a suitable resin 52, such as epoxy or nylon, or polyester resin, which is cast within an annular coil housing 54, the latter being formed of a paramagnetic material, such as steel or malleable iron. The coil housing 54 includes a radially outer wall 56, a closed end wall 58 adjacent the casing 13, a radially inner wall 60 spaced a predetermined distance apart from the coil 50, and an open end 62 opposite the closed end wall 58. A plurality of equally spaced, axially extending bosses 64 are formed on the face of the closed end wall 58 of the housing 54 for mounting cooperation with a plurality of equally spaced openings 65 formed on the front wall of the casing 13.

A bearing 66 having inner and outer races 68 and 70, respectively, is mounted around the tubular extension 14 adjacent the right or rear end face 72 of the inner wall 60. A spacer 74 is mounted between the face 72 and an end face 76 of the inner race 68. A space 78 separates the outer race 70 from the spacer 74. The bearing 66 is retained in place on the tubular extension 14 by a split locking ring 80 mounted in a groove 82 formed in the outer surface of the tubular extension.

A pulley assembly 84 includes, in part, front and rear cylindrical end portions 86 and 88, respectively, and an intermediate pulley groove portion 90 for supporting a drive belt 92. The cylindrical end and groove portions may be formed of sheet metal, if desired. A knurled surface 94 is formed on the innermost surface of the pulley groove 90 for a purpose described below.

The pulley assembly 84 further includes a cylindrical pulley hub or sleeve member 96 mounted around the outer bearing race 70 and having one end thereof extending into the coil housing 48 in the space between the inner wall 60 and the coil 50. A knurled surface 98 is formed on the outer surface of the pulley hub member 96 directly opposite the knurled surface 94. An aluminum ring or sleeve member 100 is mounted in any suitable manner, such as by swaging, between the oppositely disposed knurled surfaces 94 and 98 for supporting the outer pulley elements 86, 88 and 90 on the pulley hub 96 such that the front cylindrical end portion 86 extends freely past the outer wall 56 of the coil housing 54 a minimal annular gap 101 width away therefrom. The pulley groove portion 90 extends radially inwardly past the open end 62 of the coil housing. An annular radially extending pole member or clutch rotor 102 is secured to the rear end of the pulley hub 96 and spaced at its outer edge a predetermined annular gap 104 width away from the inner surface of the rear cylindrical end portion 88 adjacent the free end thereof. A plurality of circumferentially spaced, concentric arcuate slots 106 are formed in the clutch rotor 102 providing spaced bridging elements 107 at the radially inner peripheral edge thereof, adjacent the pulley hub 96.

An armature plate-driven plate assembly 108 is mounted on the drive hub 38, the assembly 108 including an armature plate 110 shown in a deenergized position adjacent the outer face of the pole member or rotor 102, there being a variable width, radially extending gap or space 112 therebetween. A plurality of conventional circumferentially spaced, concentric arcuate slots 114 are formed in the armature plate 110 providing spaced bridging elements 115 radially intermediate the outer annular gap 112 and the inner plurality of circumferentially spaced arcuate slots 106 formed in the clutch rotor, providing a 4-pole magnetic flux path. The armature plate 110 is retained adjacent the rotor 102 by a plurality of leaf springs 116, each of which is secured by rivets 118 at opposite ends thereof to the armature plate and to a support member or drive plate 120, respectively. The drive plate 120 is secured adjacent a central opening 122 formed therein to the outer end of the drive hub 38, abutted against a flange 124, formed on the latter.

OPERATION

In operation, the clutch 10 is engaged by the energization of the electromagnetic coil 50 which causes the magnetic flux to travel a path through the adjacent paramagnetic material, i.e., from the closed end wall 58 to the adjacent outer wall 56 of the coil housing 54, across the gap 101 to the front cylindrical end portion 86 of the pulley assembly 84, through the pulley groove portion 90 to the rear cylindrical end portion 88, and, thence, traversing a serpentine path through the 4-pole clutch field resulting from the spaced relationship of the alternately located cooperating annular gap 104 and arcuate slots 114 and 106. More specifically, the flux travels from the end of the cylindrical end portion 88 directly across to the armature plate 110, thence to the pole member 102 and back again to the armature plate 110 on the radially inner side of the arcuate slots 114, and then to the end of the pulley hub 96. As a result, the gap 112 between the plane formed by the end face of the rear cylindrical end portion 88, the radially aligned pole member 102 and the end face of the pulley hub 96, and the plane of the armature plate 110 is closed as the armature plate 110 is pulled to the left in FIG. 1 against the force of the leaf spring members 116. Upon engagement of the armature plate, the drive hub 38 and the input shaft 16 are caused to rotate to drive the air-conditioning compressor 12. The flux completes its path by flowing through the pulley hub 96 and the adjacent outer race 70 of the bearing 84 to the inner wall 60 and the end wall 58 of the coil housing 54, to complete the circuit.

It should be noted that, by virtue of the aluminum sleeve 100 interconnecting the pulley groove 90 and the pulley hub 96, physical connection between the second cylindrical end portion 88 and the rotor or pole member 102 is eliminated. As a result, there is no shorting across the air gap 104, and, consequently, the lines of flux or force at the outermost pole attracting the armature plate 110 to the end face of the second cylindrical end portion 88 are at their maximum strength, attracting the armature plate quickly. This is particularly significant when one considers that torque = force × distance, where distance is the length of the radius to the pole. Hence, eliminating shorting across the gap 104 at the radially outermost pole improves the performance of the clutch 10 in quickly and efficiently driving the input shaft 16 of the compressor 12. Also, the drive belt in this arrangement is substantially radially aligned with the bearing 66, which is known to prolong the operational life of the bearing, as compared to having the drive belt located forward or rearward of the bearing.

While but one embodiment of the invention has been shown and described, other modifications thereof are possible.

The embodiments of the invention in which an exclusive property or privilege is claimed are defined as follows:

1. For use with an air-conditioning compressor including a casing having a fixed tubular extension extending from an end surface thereof and a drive shaft extending centrally through said tubular extension, with a drive hub secured to said drive shaft, an electromagnetic clutch comprising a coil housing having inner and outer walls, an energizable electromagnetic coil mounted in said coil housing, a bearing mounted around said tubular extension adjacent the end of said inner wall, drive means secured to said drive hub, an armature plate positioned adjacent said drive means on the coil side thereof, spring means secured at one end thereof to said armature plate and at the other end thereof to said drive means for movably supporting said armature plate and driveably connecting said armature plate to said drive means, a pulley operatively mounted intermediate said armature plate and said coil housing and including inner and outer cylindrical end portions and an intermediate groove portion, said inner cylindrical end portion extending freely adjacent said outer wall of said coil housing, said groove portion extending radially inwardly from said end portions, a pulley hub mounted around said bearing, and a non-magnetic member mounted in support relationship between the innermost surface of said groove portion and the adjacent outer surface of said pulley hub to form a pulley assembly in which the outer end portion of said pulley extends freely toward said armature plate, a clutch rotor secured to the end of said pulley hub adjacent said armature plate and extending radially outwardly therefrom so as to provide a radially outer uninterrupted circular air space with respect to the adjacent inner surface of said outer cylindrical end portion of the pulley, first slot means formed with spaced bridging in a radially inner portion of said clutch rotor providing an interrupted inner air gap adjacent the pulley hub, and second slot means formed with spaced bridging in said armature plate providing an interrupted air gap intermediate said uninterrupted outer air space and said inner air gap, the arrangement providing a magnetic flux path having the characteristic that no shorting can occur across said uninterrupted outer air space so that said armature plate is attracted more quickly with stronger magnetic force when said electromagnetic coil is energized.

2. For use with an air-conditioning compressor including a casing having a fixed tubular extension extending from an end surface thereof andd a drive shaft extending centrally through said tubular extension, with a drive hub secured to said drive shaft, an electromagnetic clutch comprising a coil housing having inner and outer walls, an energizable electromagnetic coil mounted in said coil housing, a bearing mounted around said tubular extension adjacent the end of said inner wall, drive means secured to said drive hub, an armature plate positioned adjacent said drive means on the coil side thereof, spring means secured at one end thereof to said armature plate and at the other end thereof to said drive means for movably supporting said armature plate and driveably connecting said armature plate to said drive means, a pulley operatively mounted intermediate said armature plate and said coil housing and including inner and outer cylindrical end portions and an intermediate groove portion, said inner cylindrical end portion extending freely adjacent said outer wall of said coil housing, said groove portion extending radially inwardly from said end portions, a pulley hub mounted around said bearing, and a non-magnetic member mounted in support relationship between the innermost surface of said groove portion and the adjacent outer surface of said pulley hub form a pulley assembly in which the outer end portion of said pulley extends freely toward said armature plate providing a first pole therewith, a clutch rotor secured to the end of said pulley hub adjacent said armature plate and extending radially outwardly therefrom so as to provide a radially outer uninterrupted circular air space with respect to the adjacent inner surface of said outer cylindrical end portion of the pulley, a first plurality of arcuate slots formed with spaced bridging in a radially inner portion of said clutch rotor providing an interrupted inner air gap adjacent the pulley hub, and a second plurality of arcuate slots formed with spaced bridging in said armature plate providing an interrupted air gap intermediate said uninterrupted outer air space and said inner air gap, the arrangement providing a 4-pole magnetic flux path having the characteristic that no shorting can occur across said uninterrupted outer air space bypassing said first pole, so that said armature plate is attracted more quickly with stronger magnetic force when said electromagnetic coil is energized.

3. For use with an air-conditioning compressor including a casting having a fixed tubular extension extending from an end surface thereof and a drive shaft extending centrally through said tubular extension, with a drive hub secured to said drive shaft, an electromagnetic clutch comprising a coil housing having an open end facing away from said casing, an electromagnetic coil mounted in said coil housing, a bearing mounted around said tubular extension beyond said open end of said coil housing, a drive plate secured to said drive hub, an armature plate positioned adjacent said drive plate on the coil side thereof, a plurality of leaf springs, each secured at one end thereof to said armature plate and at the other end thereof to said drive plate, a pulley assembly operatively mounted intermediate said armature plate and said coil housing and including inner and outer cylindrical end portions and an intermediate groove portion, said inner cylindrical end portion extending freely past the outer peripheral surface of said coil housing, said groove portion extending radially inwardly adjacent said open end of said coil housing, a pulley hub mounted around said bearing, an aluminum ring member mounted between the innermost surface of said groove portion and the adjacent outer surface of said pulley hub, a clutch rotor secured to the end of said pulley hub adjacent said armature plate and extending radially outwardly therefrom so as to provide an outer annular air space with respect to the adjacent inner surface of said outer cylindrical end portion, a first plurality of concentric circumferentially spaced, arcuate slots formed in a radially inner portion of said clutch rotor providing an inner air gap, and a second plurality of concentric circumferentially spaced, arcuate slots formed in said armature plate providing a central air gap intermediate said outer annular air space and said inner air gap, the arrangement providing a magnetic flux path with no shorting across said outer annular air space.

4. For use with an air-conditioning compressor including a casing having a fixed tubular extension from an end surface thereof and a drive shaft extending centrally through said tubular extension with a drive hub secured to said drive shaft, an electromagnetic clutch comprising a stationary coil housing having inner and outer walls, a side wall adjacent said casing and an open end facing away from said casing, an electromagnetic coil mounted in said coil housing, a bearing mounted around said tubular extension adjacent the rear end of said inner wall, a drive plate secured to said drive hub, an armature plate positioned adjacent said drive plate on the coil side thereof, a plurality of leaf springs, each secured at one end thereof to said armature plate and at the other end thereof to said drive plate, a pulley assembly operatively mounted intermediate said armature plate and said coil housing and including inner and outer cylindrical end portions and an intermediate groove portion, said inner cylindrical end portion extending freely past said outer wall of said coil housing, said groove portion extending radially inwardly adjacent said open end of said coil housing, a pulley hub mounted around said bearing and extending axially into said coil housing intermediate said inner wall and said coil, an aluminum ring member mounted between the innermost surface of said groove portion and the adjacent outer surface of said pulley hub, a clutch rotor secured to the end of said pulley hub adjacent said armature plate and extending radially outwardly therefrom so as to provide an uninterrupted circular air space with respect to the adjacent inner surface of said outer cylindrical end portion, a first plurality of concentric circumferentially spaced, arcuate slots formed in a radially inner portion of said clutch rotor providing an inner air gap, and a second plurality of concentric circumferentially spaced, arcuate slots formed in said armature plate providing a central air gap intermediate said outer air space and said inner air gap, the arrangement providing a 4-pole magnetic flux path having the characteristic that no shorting can occur across said uninterrupted outer air space so that said armature plate is attracted more quickly with stronger magnetic force when said electromagnetic coil is energized.

* * * * *

UNITED STATES PATENT OFFICE
CERTIFICATE OF CORRECTION

Patent No. 4,122,930     Dated October 31, 1978

Inventor(s) George T. Bennett et al.

It is certified that error appears in the above-identified patent and that said Letters Patent are hereby corrected as shown below:

Column 1, line 40, "automatic" should read -- automotive --.

Column 5, line 28, "casting" should read -- casing --.

Column 6, line 12, after "extension" insert -- extending --.

Signed and Sealed this

First Day of May 1979

[SEAL]

Attest:

RUTH C. MASON
Attesting Officer

DONALD W. BANNER
Commissioner of Patents and Trademarks